(12) United States Patent
Jung et al.

(10) Patent No.: US 7,418,041 B2
(45) Date of Patent: Aug. 26, 2008

(54) TRANSMITTING/RECEIVING APPARATUS AND METHOD FOR REDUCING PAPR IN AN OFDM MOBILE COMMUNICATION SYSTEM

(75) Inventors: Ki-Ho Jung, Seoul (KR); Heung-Gyooun Ryu, Chongju-shi (KR); Sung-Ryul Yun, Chungchongbuk-do (KR); Byoung-Il Jin, Chonen-shi (KR); In-Bae Kim, Chonen-shi (KR)

(73) Assignee: Samsung Electronics Co., Ltd. (KR)

( * ) Notice: Subject to any disclaimer, the term of this patent is extended or adjusted under 35 U.S.C. 154(b) by 755 days.

(21) Appl. No.: 10/630,216

(22) Filed: Jul. 30, 2003

(65) Prior Publication Data

US 2004/0058701 A1  Mar. 25, 2004

(30) Foreign Application Priority Data

Jul. 30, 2002  (KR) .............. 10-2002-0044924

(51) Int. Cl.
H04K 1/10  (2006.01)

(52) U.S. Cl. .............. 375/260; 375/295; 370/208; 370/342

(58) Field of Classification Search .......... 455/522; 375/260, 295, 285; 370/342, 343, 208, 482
See application file for complete search history.

(56) References Cited

U.S. PATENT DOCUMENTS

| 7,006,429 B2* | 2/2006 | Yoshida et al. ............. 370/208 |
| 2002/0172184 A1* | 11/2002 | Kim et al. ................... 370/344 |
| 2003/0016640 A1* | 1/2003 | Onggosanusi et al. ....... 370/335 |
| 2003/0147655 A1* | 8/2003 | Shattil ........................ 398/182 |
| 2004/0141458 A1* | 7/2004 | Park et al. ................... 370/208 |

FOREIGN PATENT DOCUMENTS

| EP | 0 869 646 | 10/1998 |
| EP | 0 924 910 | 6/1999 |
| EP | 1 039 714 | 9/2000 |
| EP | 1 041 763 | 6/2006 |

OTHER PUBLICATIONS

International Search Report dated Nov. 19, 2003 issued in a counterpart application, namely Appln. No. PCT/KR03/01517.
Heung-Gyoon Ryu et al., "A New PAPR Reduction Scheme: SPW (Subblock Phase Weighting)", 2002 IEEE, pp. 81-89.
Hyo-Joo Ahn et al., "A Block Coding Scheme for Peak-to-Average Power Ratio Reduction in an Orthogonal Frequency Division Multiplexing System", 2000 IEEE, pp. 56-60.
Van Nee, OFDM Codes for Peak-to-Average Power Reduction and Error Correction, 1996 IEEE.

* cited by examiner

*Primary Examiner*—Temesghen Ghebretinsae
(74) *Attorney, Agent, or Firm*—The Farrell Law Firm, P.C.

(57) ABSTRACT

A block coding apparatus and method in an OFDM mobile communication system are provided. They reduce PAPR to 3 dB or less, while increasing a traditional block coding rate by twice, by use of complementary sequences. Therefore, spectral efficiency is improved by twice, maintaining the traditional error correction capability, and thus decoding is facilitated.

18 Claims, 14 Drawing Sheets

TRANSMITTING/RECEIVING APPARATUS AND METHOD FOR REDUCING PAPR IN AN OFDM MOBILE COMMUNICATION SYSTEM

PRIORITY

This application claims priority under 35 U.S.C. § 119 to an application entitled "Transmitting/Receiving Apparatus and Method for Reducing PAPR in an OFDM Mobile Communication System" filed in the Korean Intellectual Property Office on Jul. 30, 2002 and assigned Serial No. 2002-44924, the contents of which are incorporated herein by reference.

BACKGROUND OF THE INVENTION

1. Field of the Invention

The present invention relates generally to a transmitting/receiving apparatus and method using block coding in an OFDM (Orthogonal Frequency Division Multiplexing) mobile communication system, and in particular, to a transmitting/receiving apparatus and method for reducing through block coding a high PAPR (Peak-to-Average Power Ratio) resulting from multiple sub-carriers.

2. Description of the Related Art

In general, OFDM is a two-dimensional multiplexing scheme of TDM (Time Division Multiplexing) and FDM (Frequency Division Multiplexing) in combination. An OFDM symbol is transmitted over sub-carriers forming a sub-channel.

By allowing the spectrum of each sub-carrier to overlap with orthogonality, OFDM increases the overall spectral efficiency. Since IFFT (Inverse Fast Fourier Transform) and FFT (Fast Fourier Transform) provide OFDM modulation and demodulation, an efficient digital implementation of a modulator and a demodulator can be carried out. Furthermore, due to its robustness against frequency-selective fading and narrow-band interference, OFDM is effective for high-speed data transmission for the current European digital broadcasting and large-volume radio communication systems based on such standards such as IEEE 802.11a, IEEE 802.16 and IEEE 802.20.

Since an OFDM communication system transmits data over multiple sub-carriers, the amplitude of a final OFDM signal is the sum of the amplitudes of the sub-carriers. Hence, if each sub-carrier has the same phase, a very high PAPR results.

With a very high PAPR, an amplifier exceeds its linear operation range and a signal suffers from distortion after being processed by the amplifier in a typical OFDM communication system. Consequently, a transmitted OFDM signal does not have a constant amplitude variation due to the phase difference between sub-carriers. Moreover, backoff from an operating point from the maximum power available from the amplifier increases thereby decreasing amplifier efficiency and increasing power consumption. The high PAPR signal reduces the efficiency of a linear amplifier and forces the operating point of a non-linear amplifier into a non-linear region. As a result, the high PAPR introduces both in-band distortion and out-of-band spectrum regrowth.

Many techniques have been proposed for PAPR reduction. One of them is to use a pre-distorter having the non-linear and inverse function characteristics of a power amplifier to be linearized, for avoiding signal distortion. Also, a non-linear amplifier can be made to operate in a linear region through a backoff from its operating point. However, these methods have the shortcomings of circuit complexity in a high frequency band, low power efficiency, and cost increases.

SUMMARY OF THE INVENTION

It is, therefore, an object of the present invention to provide a block coding apparatus and method for reducing a PAPR using complementary sequences in an OFDM mobile communication system.

It is another object of the present invention to provide an apparatus and method for increasing a coding rate, limiting to a predetermined level (3 dB), a PAPR resulting from multiple sub-carriers, to thereby improve spectral efficiency in an OFDM mobile communication system.

The above objects are achieved by a PAPR reduction apparatus and method.

According to one aspect of the present invention, in a method of reducing the PAPR of a signal transmitted on a plurality of ($N=2^r$) sub-carriers in a transmitting apparatus including a serial to parallel converter for converting serial data to parallel data $k_1, k_2, \ldots, k_{r+2}$ and a plurality of (t) encoders for block coding the parallel data $k_1, k_2, \ldots, k_{r+2}$ in an OFDM mobile communication system, all or part of the parallel data $k_1, k_2, \ldots, k_{r+2}$ is received and at least one operator bit $k_{r+3}, \ldots, k_{2r}$ is generated which render block coded symbols complementary. The parallel data $k_1, k_2, \ldots, k_{r+2}$ and the at least one operator bit $k_{r+3}, \ldots, k_{2r}$ are equally ($=2^r/t$) distributed to the encoders and the distributed data is encoded in the encoders.

According to another aspect of the present invention, in an apparatus for reducing the PAPR of a signal transmitted on a plurality of ($N=2^r$) sub-carriers in a transmitting apparatus including a serial to parallel converter for converting serial data to parallel data $k_1, k_2, \ldots, k_{r+2}$ in an OFDM mobile communication system, an operator generator receives all or part of the parallel data $k_1, k_2, \ldots, k_{r+2}$ and generates at least one operator bit $k_{r+3}, \ldots, k_{2r}$ that render block coded symbols complementary, and each of a plurality of encoders receives an equal part ($=2^r/t$) of the parallel data $k_1, k_2, \ldots, k_{r+2}$ and the at least one operator bit $k_{r+3}, \ldots, k_{2r}$ and block codes the received data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
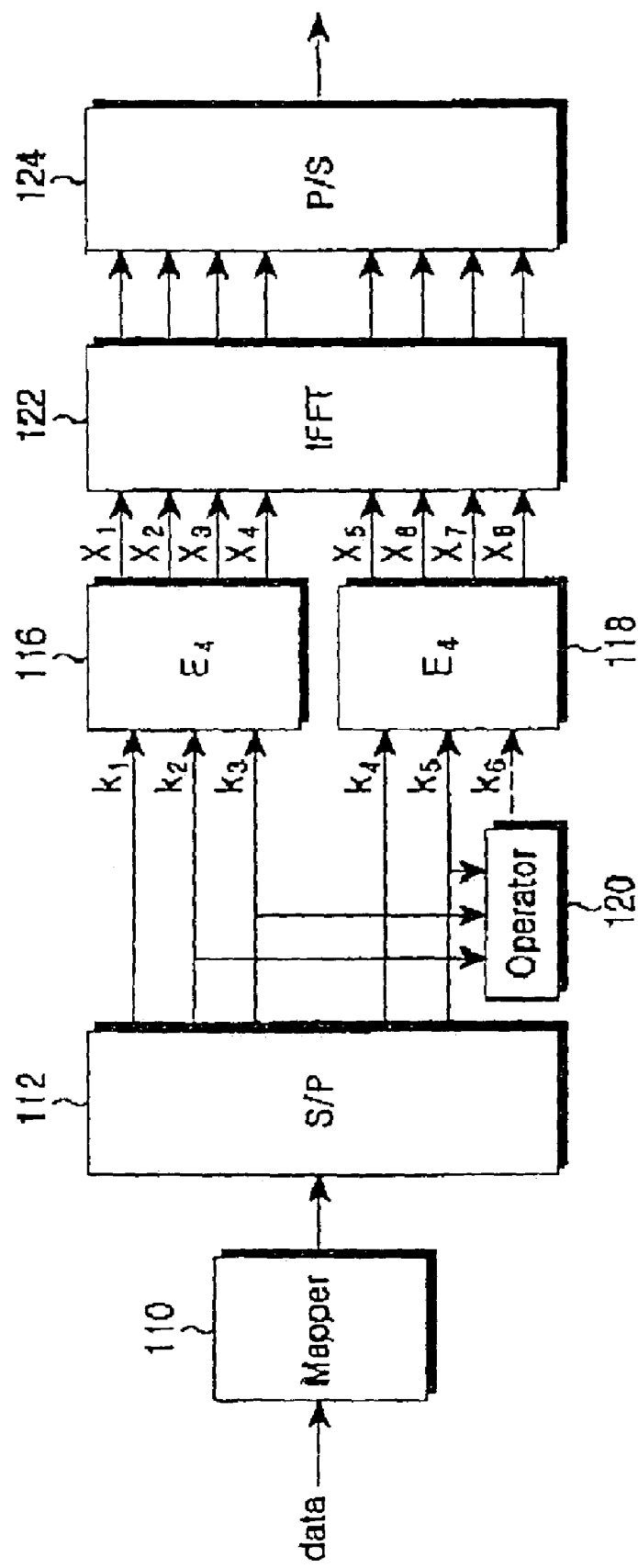
FIG. 1 is a block diagram of a transmitter in an OFDM mobile communication system using block coding according to an embodiment of the present invention.

A preferred embodiment of the present invention will be described herein below with reference to the accompanying drawings. In the following description, well-known functions or constructions are not described in detail since they would obscure the invention in unnecessary detail.

The present invention proposes a novel block coding method for PAPR reduction in an OFDM mobile communication system. In traditional block coding, a low PAPR codeword of all codewords is chosen for transmission. From extensive research results, most codewords with low PAPR are Golay complementary sequences. Based on this idea, complementary sequences are simply formed out of data using a G-matrix and a b-vector. The conversion of data to Golay complementary sequences confined the PAPR to 3 dB, enabling even error correction. This block coding method was adopted in a European Magic Wand system.

Transmission of an information word of length w at a coding rate $$\frac{w}{2^{w-1}}$$

takes $2^{w-1}$ code symbols, signifying that less information words than codewords are actually transmitted. Thus, as the coding rate decreases with an information word length, spectral efficiency is reduced.

Given a large number of sub-carriers, a plurality of block encoders can be used to maintain a coding rate, increasing the PAPR to 6 dB or higher.

A PAPR reduction technique in accordance with the present invention adopts a novel block coding that uses two encoders, limiting a PAPR to 3 dB and resulting in a block coding rate of $$\frac{w}{2^{w-2}},$$

twice higher than the existing block coding rate. Nevertheless, the proposed method preserves the error correction capability of the traditional block coding.

Before describing an embodiment of the present invention, it will be made apparent that the use of a plurality of encoders increases the PAPR and decreases error correction capability.

A complex baseband OFDM symbol is expressed as $$x(t) = \sum_{n=0}^{N=1} X_n e^{j2\pi nt/T_S}, \quad 0 \le t < T_S \tag{1}$$

where $X_n$ is a complex data symbol, N is the number of sub-carriers, and $T_s$ is an OFDM symbol period. And PAPR is defined as $$PAPR \equiv 10\log_{10}\frac{P_{peak}}{P_{av}} \quad [dB] \tag{2}$$

where $P_{peak}$ and $P_{av}$ are peak power and average power, respectively. They are determined by $$P_{peak} = \max|x(t)|^2 = |NA|^2 \tag{3}$$

$$P_{av} = \frac{1}{T}\int_0^T |x(t)|^2 dt = NA^2 \tag{4}$$

Therefore, a theoretical max PAPR is $$PAPR_{max} = 10\log_{10}N[dB] \tag{5}$$

A multi-sub-carrier signal having complementary sequences has a PAPR equal to or less than 3 dB due to the following properties of the complementary sequences.

The complementary sequences are also complementary in power spectrum. For example, the power spectra of a complementary pair, $A_N$ and $B_N$, be $|X_{A_N}(t)|^2$ and $|X_{B_N}(t)|^2$. Then the peak power of $|X_{A_N}(t)|^2$ is defined as $$P_{peak} = \max_t |x_{A_N}(t)|^2 \quad (6)$$

$$\leq \max_t \{|x_{A_N}(t)|^2 + |x_{B_N}(t)|^2\}$$

$$= \max_t F\{R_{A_N}(n) + R_{B_N}(n)\}$$

$$= \max_t F\{2NA^2\delta_n\}$$

$$= 2NA^2$$

where $F\{\}$ is Fourier transform, $R_{X_N}(n)$ is an aperiodic autocorrelation function for $X_N=[X_0, X_1, \ldots, X_{N-1}]$, and $\delta_n$ is a Dirac delta function.

The aperiodic autocorrelation function is defined as $$R_{X_N}(n) = \sum_{i=0}^{N-1-n} x_i \cdot x_{i+n}^* \quad (7)$$

where * is a complex conjugate. And the Dirac delta function is defined as $$\delta_n = \begin{cases} 1, & n=0 \\ 0, & \text{otherwise} \end{cases} \quad (8)$$

Hence, $$PAPR \leq 10\log_{10}\frac{2NA^2}{NA^2} = 3 \ [\text{dB}] \quad (9)$$

One way to reduce PAPR, maintaining a coding rate in the case of a large number of sub-carriers, is to use m encoders ($E_{N/m}$, N is the number of sub-carriers and m is the number of encoders used). For example, when two encoders are used for an OFDM communication system with N=8, the coding rate of each encoder $$R = \frac{w}{2^{w-1}} = \frac{w}{N/2} = \frac{3}{2^{3-1}} = \frac{3}{4}.$$

For N=2×4=8, the maximum PAPR is given by $$PAPR_{max}=3+10 \log_{10}2=6[\text{dB}] \quad (10)$$

In general, $N=mx2^{w-1}$. When $$R = \frac{w}{2^{w-1}},$$

$$PAPR_{max}=3+10 \log_{10}m[\text{dB}] \quad (11)$$

where m is the number of encoders.

As described above, the use of a plurality of encoders increases the PAPR and decreases the error correction capability.

However, the present invention reduces the PAPR from 6 dB computed by Eq. (11) to 3 dB, maintaining the error correction capability, when two encoders ($E_{N/2}$) are used, instead of one encoder ($E_N$) in an OFDM communication system using N sub-carriers. For BPSK (Binary Phase Shift Keying) symbols, $$R\left(=\frac{w}{N}\right)$$

is increased from $$\frac{w}{2^{w-1}}$$

to $$\frac{w}{2^{w-2}}$$

as compared to the traditional block coding.

1. N=8, BPSK 1.1 Transmitter Using the Proposed Block Coding

FIG. 1 is a block diagram of a transmitter using BPSK for N=8 according to an embodiment of the present invention.

Referring to FIG. 1, a mapper 110 modulates input data, and a serial-to-parallel (S/P) converter 112 converts a serial modulated data to five parallel data streams $k_1, k_2, k_3, k_4, k_5$ and outputs some of them $k_1, k_2, k_3$ to a first encoder 116 and the others $k_4, k_5$ to a second encoder 118. Each of the encoders 116 and 118 carries out block coding on the input data with $$R = 3/4\left(=\frac{w}{2^{w-1}}=\frac{w}{N/2}=\frac{3}{2^{3-1}}\right).$$

In other words, the first and second encoders 116 and 118 are $E_4$ encoders that output 4(N/2) coded bits for the input of 3 data bits. To form a complementary sequence with data $X_1, X_2, X_3, X_4, X_5, X_6, X_7, X_8$ applied to the input of an IFFT 122, one $k_6$ of the data at the input of the second encoder 118 is designated as an operator, and its value is determined according to $k_1$ to $k_5$.

1.2 Indicator Setting in the Proposed Block Coding

For BPSK with N=4, the input $k_1, k_2, k_3$ and output $X_1, X_2, X_3, X_4$ of the first encoder 116 are in the relationship illustrated in Table 1.

TABLE 1

| Input | | | Output | | | | Indicator |
|---|---|---|---|---|---|---|---|
| $k_1$ | $k_2$ | $k_3$ | X1 | $X_2$ | $X_3$ | $X_4$ | |
| −1 | −1 | −1 | −1 | −1 | −1 | 1 | a |
| −1 | −1 | 1 | −1 | −1 | 1 | −1 | b |
| −1 | 1 | −1 | −1 | 1 | −1 | −1 | B |
| −1 | 1 | 1 | −1 | 1 | 1 | 1 | −A |
| 1 | −1 | −1 | 1 | −1 | −1 | −1 | A |
| 1 | −1 | 1 | 1 | −1 | 1 | 1 | −B |
| 1 | 1 | −1 | 1 | 1 | −1 | 1 | −b |
| 1 | 1 | 1 | 1 | 1 | 1 | −1 | −a |

In view of the properties of the complementary sequences, for a codeword with low PAPR, its reverse, inverse, and M-ary modulation have low PAPR.

The indicators in Table 1 indicate this relationship. Given two independent base indicators a and b, "−a" and "−b" denote their inverses, and "A" and "B" denote their reverses. The outputs are length 4 complementary sequences with a 3 dB PAPR.

For BPSK, if N=4, there are two base indicators a and b and if N=8, there are four base indicators a, b, c, d. For N=8, a total of 256 ($M^N$=28) codewords are available and 64 (=$2^6$) of them have a PAPR equal to or less than 3 dB. Table 2 is a tabulation of 32 (=$2^5$) complementary sequences selected from the 64 codewords With the 3 dB or lower PAPR.

to 16 complementary sequences for the traditional block coding. Therefore, the coding rate is increased.

The use of two $E_4$ encoders increases the coding rate directly from 4/8 to 6/7, but the resulting generation of codewords other than those listed in Table 2 increases the PAPR beyond 3 dB. Hence, values at the output of the encoders are made a complementary sequence by controlling the inputs of the encoders in accordance with the present invention.

In the present invention, for BPSK and N=8, the coding rate is 5/8 so that the codewords at the input of the IFFT 122 are confined to $X_1, X_2, X_3, X_4, X_5, X_6, X_7, X_8$ of Table 2 and as a result, the PAPR is limited to 3 dB or lower.

TABLE 2

| $X_1$ | $X_2$ | $X_3$ | $X_4$ | $X_5$ | $X_6$ | $X_7$ | $X_8$ | Indicator | $X_1$ | $X_2$ | $X_3$ | $X_4$ | $X_5$ | $X_6$ | $X_7$ | $X_8$ | Indicator |
|---|---|---|---|---|---|---|---|---|---|---|---|---|---|---|---|---|---|
| −1 | −1 | −1 | 1 | −1 | −1 | 1 | −1 | a, b | 1 | −1 | −1 | −1 | −1 | 1 | 1 | −1 | A, b |
| −1 | −1 | −1 | 1 | −1 | 1 | −1 | −1 | a, B | 1 | −1 | −1 | −1 | −1 | 1 | −1 | −1 | A, B |
| −1 | −1 | −1 | 1 | 1 | −1 | 1 | 1 | a, −B | 1 | −1 | −1 | −1 | 1 | −1 | 1 | 1 | A, −B |
| −1 | −1 | −1 | 1 | 1 | 1 | −1 | 1 | a, −b | 1 | −1 | −1 | −1 | 1 | 1 | −1 | 1 | A, −b |
| −1 | −1 | 1 | −1 | −1 | −1 | −1 | 1 | b, a | 1 | −1 | 1 | 1 | −1 | −1 | −1 | 1 | −B, a |
| −1 | −1 | 1 | −1 | −1 | 1 | 1 | 1 | b, −A | 1 | −1 | 1 | 1 | −1 | 1 | 1 | 1 | −B, −A |
| −1 | −1 | 1 | −1 | 1 | −1 | −1 | −1 | b, A | 1 | −1 | 1 | 1 | 1 | −1 | −1 | −1 | −B, A |
| −1 | −1 | 1 | −1 | 1 | 1 | 1 | −1 | b, −a | 1 | −1 | 1 | 1 | 1 | 1 | 1 | −1 | −B, −a |
| −1 | 1 | −1 | −1 | −1 | −1 | −1 | −1 | B, a | 1 | 1 | −1 | 1 | −1 | −1 | −1 | 1 | −b, a |
| −1 | 1 | −1 | −1 | −1 | 1 | 1 | 1 | B, −A | 1 | 1 | −1 | 1 | −1 | 1 | 1 | 1 | −b, −A |
| −1 | 1 | −1 | −1 | 1 | −1 | −1 | −1 | B, A | 1 | 1 | −1 | 1 | 1 | −1 | −1 | −1 | −b, A |
| −1 | 1 | −1 | −1 | 1 | 1 | 1 | −1 | B, −a | 1 | 1 | −1 | 1 | 1 | 1 | 1 | −1 | −b, −a |
| −1 | 1 | 1 | 1 | −1 | −1 | 1 | −1 | −A, b | 1 | 1 | 1 | −1 | −1 | −1 | 1 | −1 | −a, b |
| −1 | 1 | 1 | 1 | −1 | 1 | −1 | −1 | −A, B | 1 | 1 | 1 | −1 | −1 | 1 | −1 | −1 | −a, B |
| −1 | 1 | 1 | 1 | 1 | −1 | 1 | 1 | −A, −B | 1 | 1 | 1 | −1 | 1 | −1 | 1 | 1 | −a, −B |
| −1 | 1 | 1 | 1 | 1 | 1 | −1 | 1 | −A, −b | 1 | 1 | 1 | −1 | 1 | 1 | −1 | 1 | −a, −b |

In accordance with the present invention, to confine the PAPR to 3 dB or less using complementary sequences unused in the traditional block coding in two encoders, the outputs of the encoders are divided by 4(=N/2) and both output sets are represented as one of the above-listed complementary sequences indicated by the corresponding indicators. This implies that all complementary sequences with 3 dB or less PAPR for N=8 can be formed using complementary sequences for N=4. That is, when N=8, two $E_4$ encoders are used instead of a single $E_8$ encoder, for which the 32 complementary sequences listed in Table 2 are available as compared For BPSK and N=8, the values as $k_1, k_2, k_3, k_4, k_5$ listed in Table 3 below at the inputs of the two $E_4$ encoders 112 and 116 lead to complementary sequences with a 3 dB PAPR at the input of the IFFT 122.

The present invention makes a coding rate be 5/8 for BPSK and N=8, so that the codewords at the input of the IFFT 122 are $X_1, X_2, X_3, X_4, X_5, X_6, X_7, X_8$ of Table 2 and thus the PAPR is confined to 3 dB or lower.

The input sequences $k_1, k_2, k_3, k_4, k_5$ of the $E_4$ encoders 116 and 118 listed in Table 3 render encoder outputs complementary. That is, Table 3 lists encoder input sequences that lead to a 3 dB PAPR for N=8.

TABLE 3

| $k_1$ | $k_2$ | $k_3$ | $k_4$ | $k_5$ | $k_6$ | Indicator | $k_1$ | $k_2$ | $k_3$ | $k_4$ | $k_5$ | $k_6$ | Indicator |
|---|---|---|---|---|---|---|---|---|---|---|---|---|---|
| −1 | −1 | −1 | −1 | −1 | 1 | a, b | 1 | −1 | −1 | −1 | −1 | 1 | A, b |
| −1 | −1 | −1 | −1 | 1 | −1 | a, B | 1 | −1 | −1 | −1 | 1 | −1 | A, B |
| −1 | −1 | −1 | 1 | −1 | 1 | a, −B | 1 | −1 | −1 | 1 | −1 | 1 | A, −B |
| −1 | −1 | −1 | 1 | 1 | −1 | a, −b | 1 | −1 | −1 | 1 | 1 | −1 | A, −b |
| −1 | −1 | 1 | −1 | −1 | −1 | b, a | 1 | −1 | 1 | −1 | −1 | −1 | −B, a |
| −1 | −1 | 1 | −1 | 1 | 1 | b, −A | 1 | −1 | 1 | −1 | 1 | 1 | −B, −A |
| −1 | −1 | 1 | 1 | −1 | −1 | b, A | 1 | −1 | 1 | 1 | −1 | −1 | −B, A |
| −1 | −1 | 1 | 1 | 1 | 1 | b, −a | 1 | −1 | 1 | 1 | 1 | 1 | −B, −a |
| −1 | 1 | −1 | −1 | −1 | −1 | B, a | 1 | 1 | −1 | −1 | −1 | −1 | −b, a |
| −1 | 1 | −1 | −1 | 1 | 1 | B, −A | 1 | 1 | −1 | −1 | 1 | 1 | −b, −A |
| −1 | 1 | −1 | 1 | −1 | −1 | B, A | 1 | 1 | −1 | 1 | −1 | −1 | −b, A |
| −1 | 1 | −1 | 1 | 1 | 1 | B, −a | 1 | 1 | −1 | 1 | 1 | 1 | −b, −a |
| −1 | 1 | 1 | −1 | −1 | 1 | −A, b | 1 | 1 | 1 | −1 | −1 | 1 | −a, b |
| −1 | 1 | 1 | −1 | 1 | −1 | −A, B | 1 | 1 | 1 | −1 | 1 | −1 | −a, B |
| −1 | 1 | 1 | 1 | −1 | 1 | −A, −B | 1 | 1 | 1 | 1 | −1 | 1 | −a, −B |
| −1 | 1 | 1 | 1 | 1 | −1 | −A, −b | 1 | 1 | 1 | 1 | 1 | −1 | −a, −b |

The operator $k_6$ is decided in an operator generator 120 according to the input data $k_1$ to $k_4$ based on an analysis of the relationship between input sequences.

The operator $k_6$ is calculated by $$k_6 = -k_2 \cdot k_3 \cdot k_5 \quad (12)$$

where · denotes multiplication.

As a result, the PAPR is confined to 3 dB, not 6 dB with use of all complementary sequences and the coding rate is 5/8, twice higher than 5/16 in the traditional block coding using one encoder.

The output of IFFT 122 is then processed by parellel-to-serial converter 124.

Figure 3:
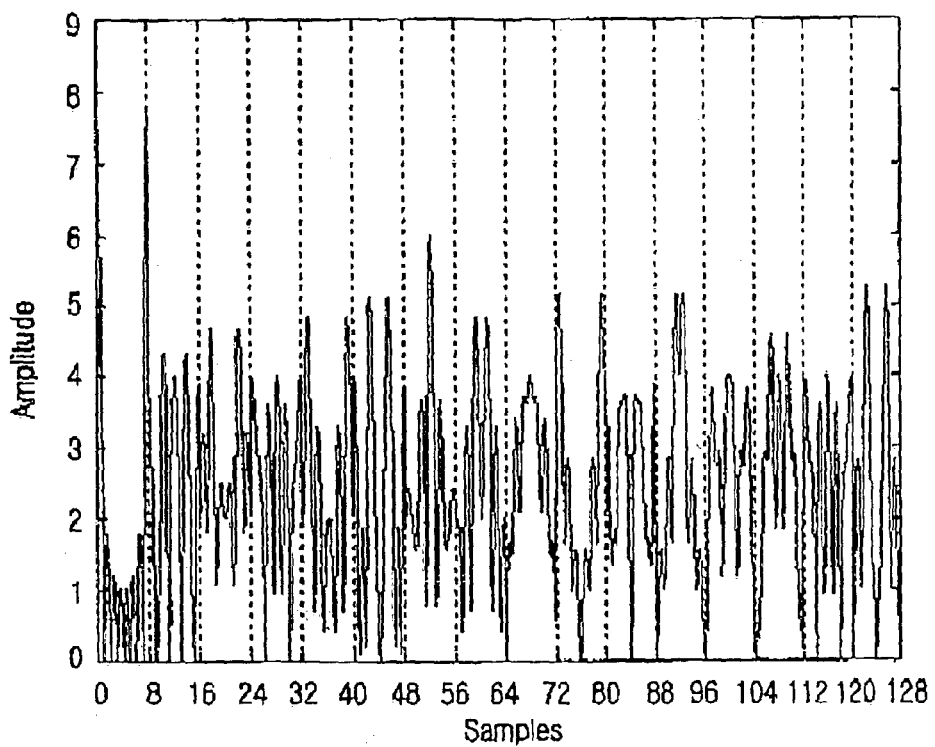
FIG. 3 illustrates an example of OFDM signal waveforms in the time domain in a conventional OFDM mobile communication system using block coding.
Figure 4:
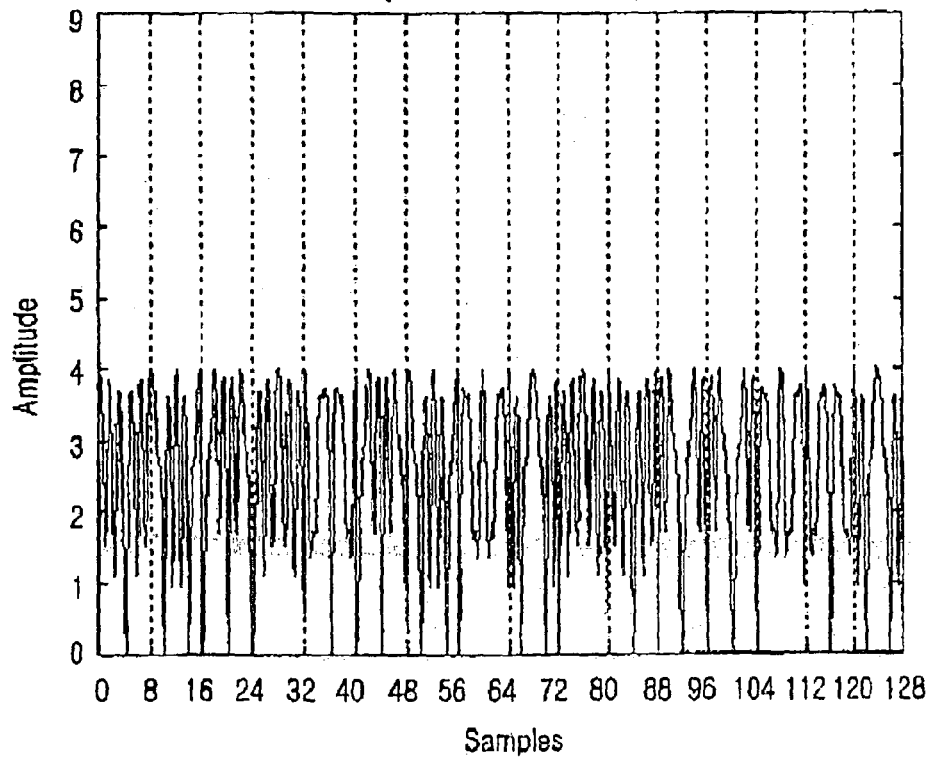
FIG. 4 illustrates an example of OFDM signal waveforms in the time domain in the OFDM mobile communication system using block coding according to the embodiment of the present invention.

FIG. 3 illustrates an example of OFDM signal waveforms in the time domain for N=8 in a conventional OFDM mobile communication system using block coding, and FIG. 4 illustrates an example of OFDM signal waveforms in the time domain for N=8 in the OFDM mobile communication system using block coding according to the embodiment of the present invention. From a comparison between FIGS. 3 and 4, it is noted that the waveforms have higher peaks in the time domain in FIG. 3 than in FIG. 4, and the inventive block coding using two encoders confine the peak values.

1.3 Receiver Using Proposed Block Coding

Figure 2:
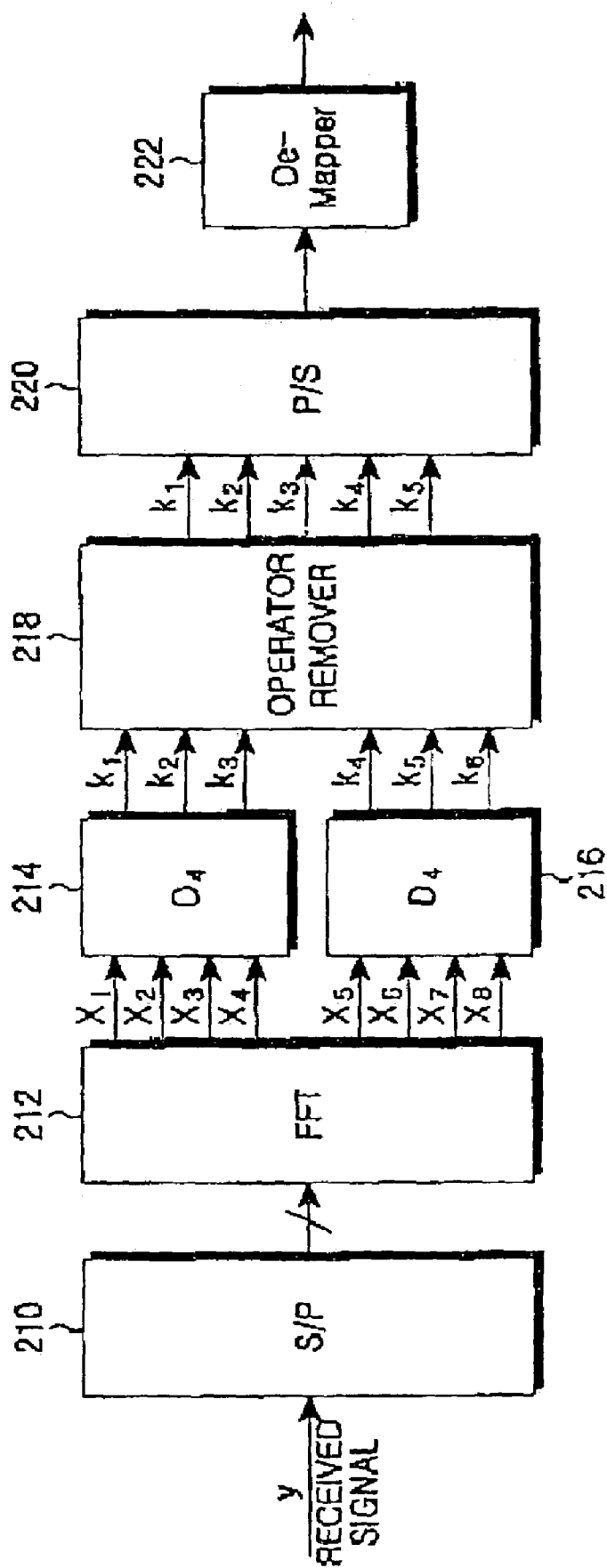
FIG. 2 is a block diagram of a receiver in the OFDM mobile communication system using block coding according to the embodiment of the present invention.

FIG. 2 is a block diagram of a receiver using the proposed block coding. As illustrated in FIG. 2, noisy received data transmitted over a channel is applied to the input of two decoders after FFT demodulation. The decoders make hard decisions to correct noise-incurred errors in the data.

Referring to FIG. 2, a signal y is received and converted to parallel data in serial-to-parallel converter 210. Decoders 214 and 216 each subtract a b-vector $b_{N/2}$ from 4 (=N/2) data received from an FFT 212 and correct errors in the data using a parity-check matrix $$H_{N/2}^T.$$

The error correction is carried out by finding an error pattern based on a syndrome and removing the error pattern from the input data. The syndrome is achieved by multiplying the received data and the transposed version of the H matrix. With no errors, the syndrome is 0. On the contrary, with errors, the syndrome contains at least one 1. The H matrix is a parity-check matrix satisfying G·HT=0 (zero matrix). Decoded data at the output of decoders 214 and 216 contain information data and parity data. The parity data is at least one operator-bit inserted by the transmitter. An operator remover 218 removes the at least one operator bit from the decoded data and outputs only the remaining data $k_1$ to $k_5$. A parallel-to-serial (P/S) converter 220 converts the information data $k_1$ to $k_5$ to serial data. A demapper 222 recovers the serial data to the original data.

Figure 5:
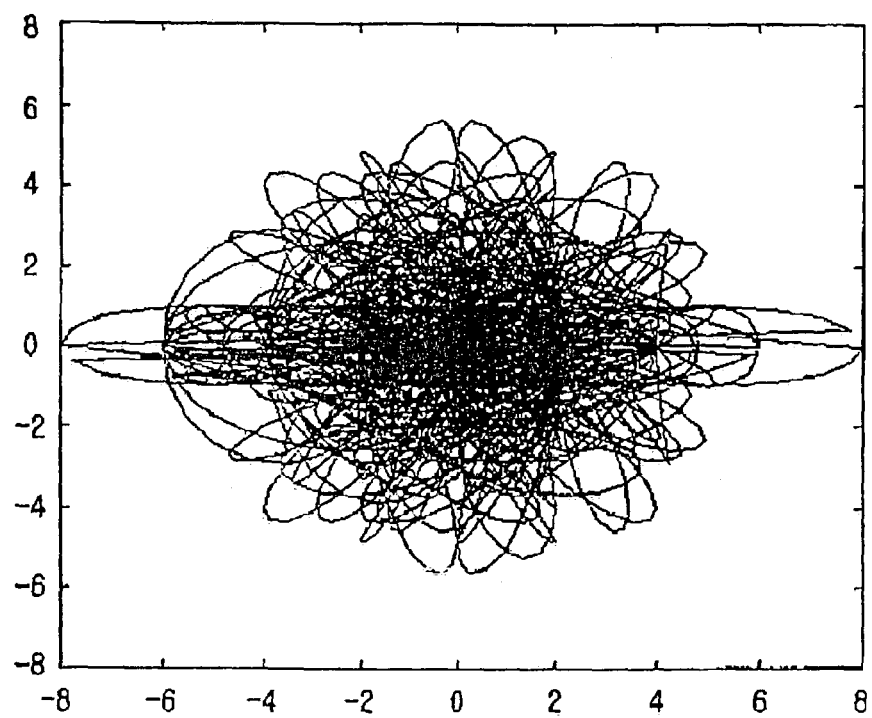
FIG. 5 illustrates an example of an OFDM signal constellation trajectory in the conventional OFDM mobile communication system using block coding.
Figure 6:
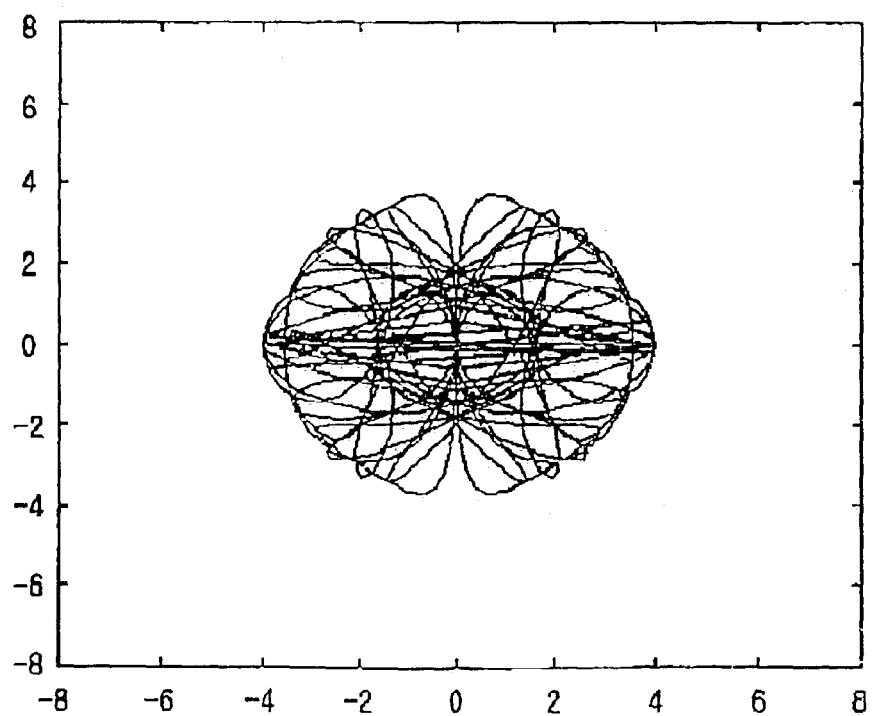
FIG. 6 illustrates an example of an OFDM signal constellation trajectory in the OFDM mobile communication system using block coding according to the embodiment of the present invention.

FIG. 5 illustrates an example of an OFDM signal constellation trajectory for N=8 in the conventional OFDM mobile communication system using block coding, and FIG. 6 illustrates an example of an OFDM signal constellation trajectory in the OFDM mobile communication system using block coding according to the embodiment of the present invention. As noted from FIGS. 5 and 6, OFDM signals are concentrated in a particular area in the inventive block coding. In accordance with the present invention, since a minimum Hamming distance is maintained, the error correction capability is preserved. Furthermore, the use of the two decoders 214 and 216 using a coding rate of 1/2 reduces the size of the receiver and thus facilitates decoding.

2. Typical Operator Generation For BPSK

For BPSK and N=16, the PAPR is limited to 3 dB, increasing the coding rate with use of two $E_8$ encoders in the above manner. The coding rate is 4/8

$$\left( = \frac{w}{2^{w-1}} \right)$$

and thus 8 (=4×2) data streams are applied to the input of the two encoders. For BPSK and N=16, the total number $M^N$ of available codewords is $2^{16}$, and $2^9$ codewords have a PAPR equal to or less than 3 dB. Here, $2^6$ of the $2^9$ codewords are complementary sequences and a maximum block coding rate using these complementary sequences is 6/16. In the traditional block coding, only half the complementary sequences, that is $2^5$, are used. Given $2^6$ complementary sequences with a PAPR at or below 3 dB, $k_1$ to $k_6$ are information data and $k_7$ and $k_8$ are operators determined by $$\begin{cases} k_7 = k_1 \cdot k_3 \cdot k_5 \\ k_8 = -k_2 \cdot k_4 \cdot k_6 \end{cases} \quad (13)$$

Consequently, the coding rate is 6/16, not the conventional coding rate of 6/32.

Figure 7:
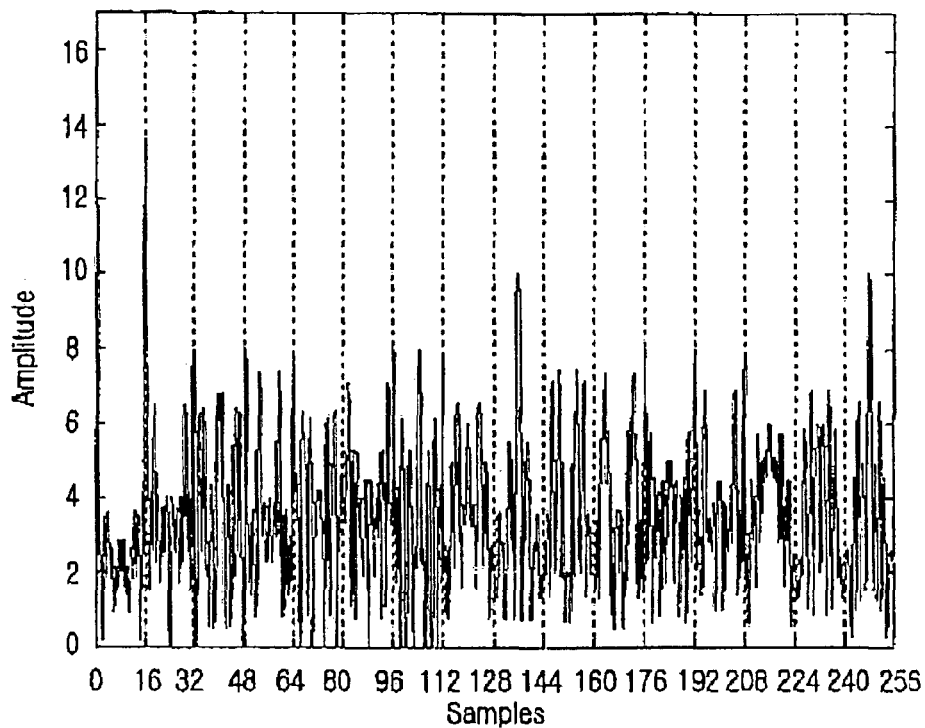
FIG. 7 illustrates another example of OFDM signal waveforms in the time domain in the conventional OFDM mobile communication system using block coding.
Figure 8:
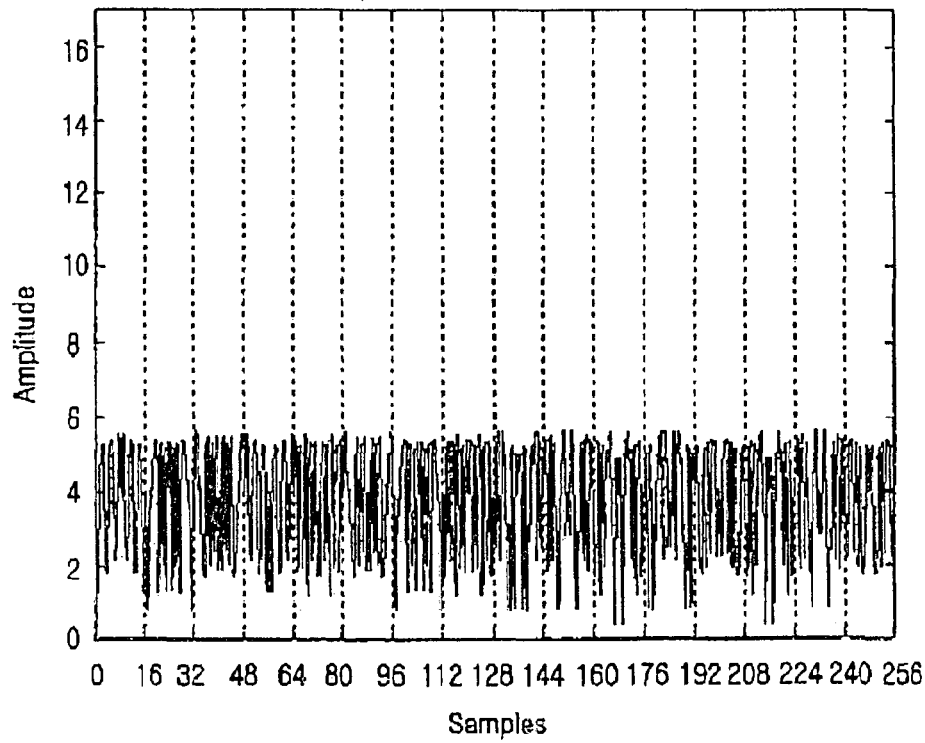
FIG. 8 illustrates another example of OFDM signal waveforms in the time domain in the OFDM mobile communication system using block coding according to the embodiment of the present invention.

FIG. 7 illustrates OFDM signal waveforms for N=16 in the time domain in the conventional OFDM mobile communication system using block coding, and FIG. 8 illustrates OFDM signal waveforms for N=16 in the time domain in the OFDM mobile communication system using block coding according to the embodiment of the present invention. The signal waveforms have higher peaks in the time domain in FIG. 7 than those in the block coding using two encoders in FIG. 8.

Figure 9:
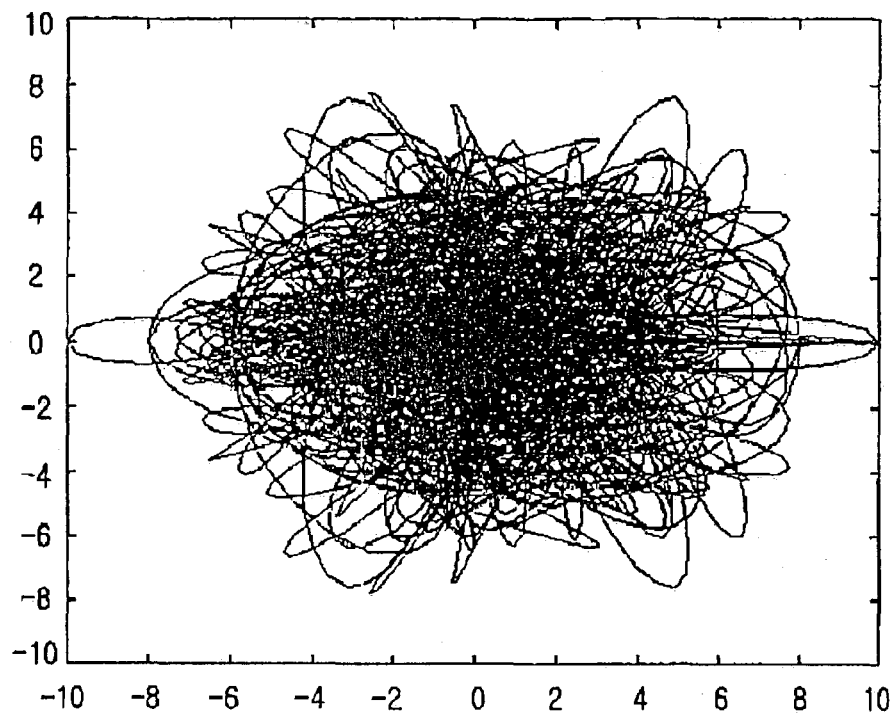
FIG. 9 illustrates another example of an OFDM signal constellation trajectory in the conventional OFDM mobile communication system using block coding.
Figure 10:
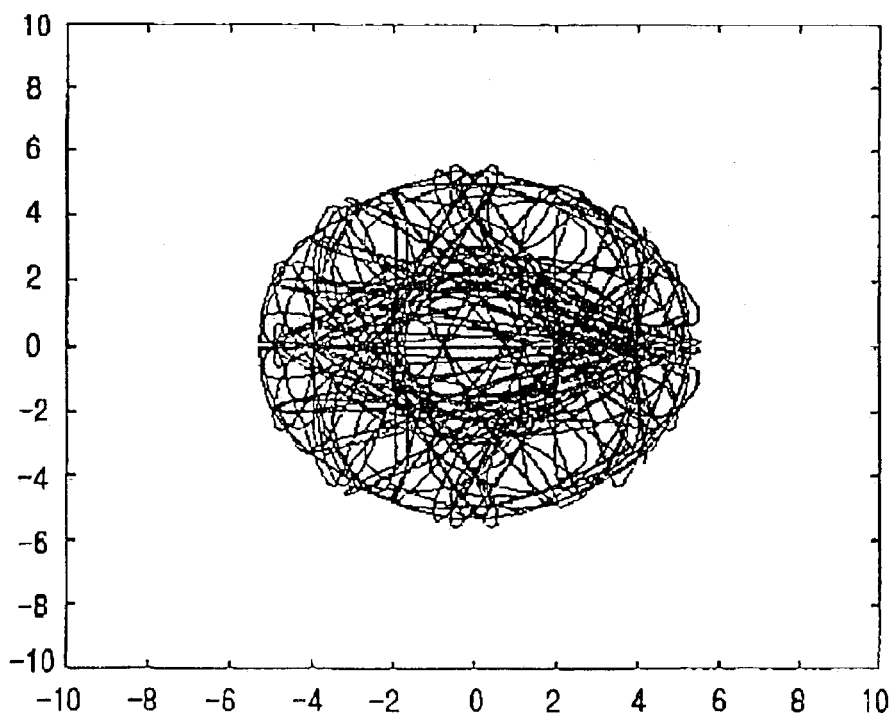
FIG. 10 illustrates another example of an OFDM signal constellation trajectory in the OFDM mobile communication system using block coding according to the embodiment of the present invention.

FIG. 9 illustrates an OFDM signal constellation trajectory for N=16 in the conventional OFDM mobile communication system using block coding, and FIG. 10 illustrates an OFDM signal constellation trajectory, for N=16 in the OFDM mobile communication system using block coding according to the embodiment of the present invention. As noted from FIGS. 9 and 10, OFDM signals are concentrated in a particular area when the block coding of the present invention is applied.

Even if the number N of sub-carriers increases, the block coding can be performed according to the sub-carrier expansion in the present invention. Thus, the operation generator formula for BPSK can be generalized according to N (=$2^r$), as $$k_{2r} = -k_2 \cdot k_r \cdot k_{r+2}$$

$$k_{2r-i} = k_1 \cdot k_{r-i} \cdot k_{r+1}, \ i = 1, \ldots, (r-3) \quad (14)$$

where r is a natural number more than 2.

Here, the number of operators is r−2.

Figure 17:
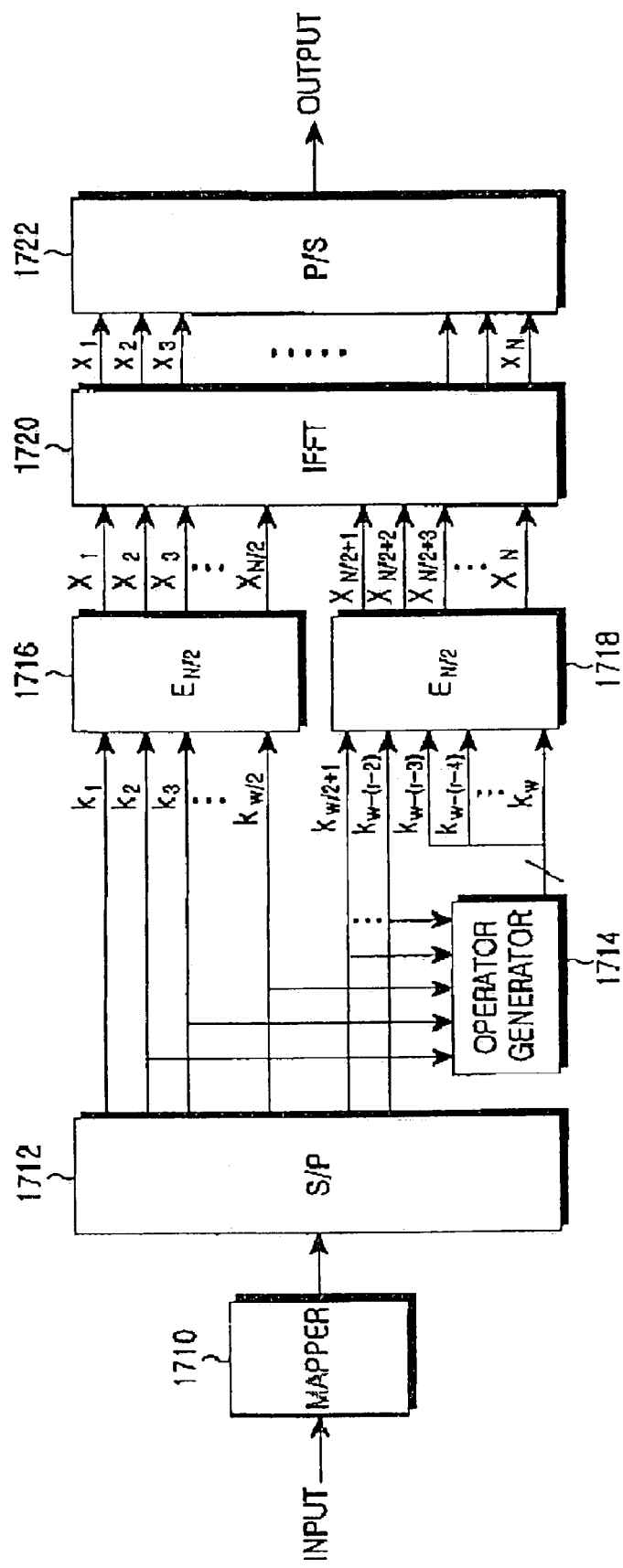
FIG. 17 is a block diagram of a transmitter using block coding according to the present invention.
Figure 18:
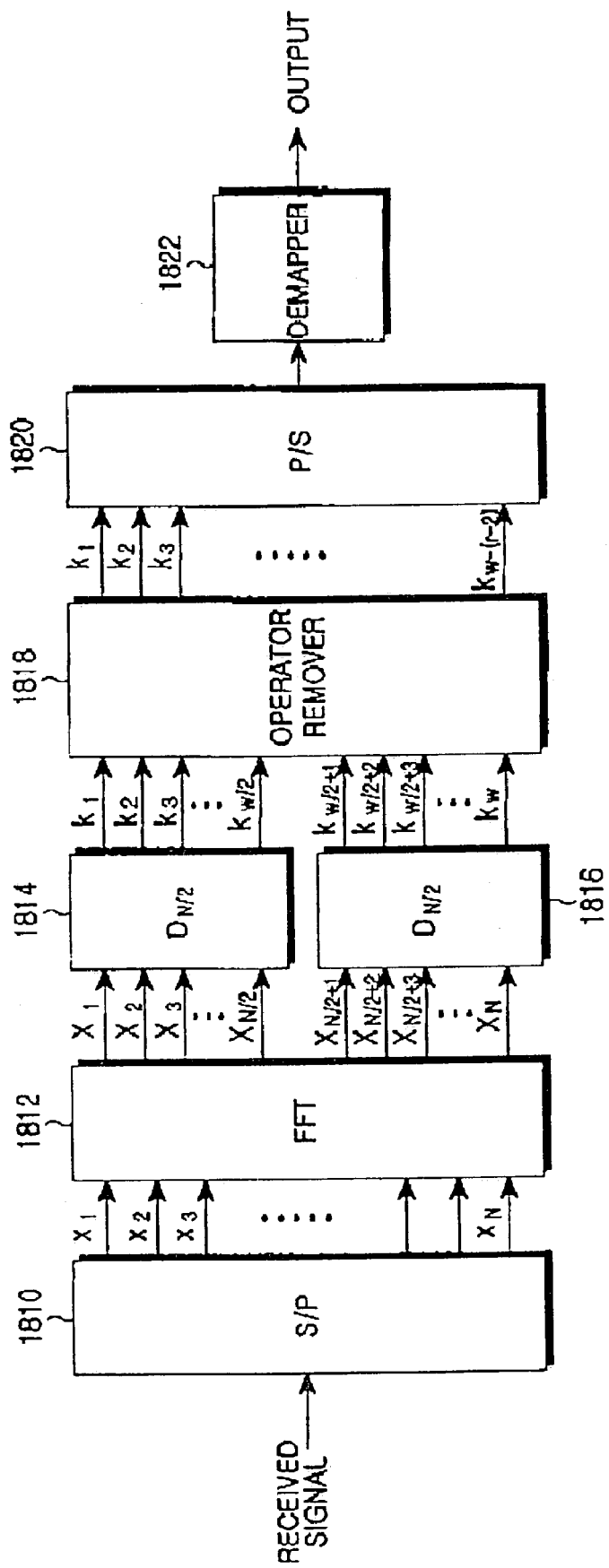
FIG. 18 is a block diagram of a receiver using block coding according to the present invention.
Figure 19A:
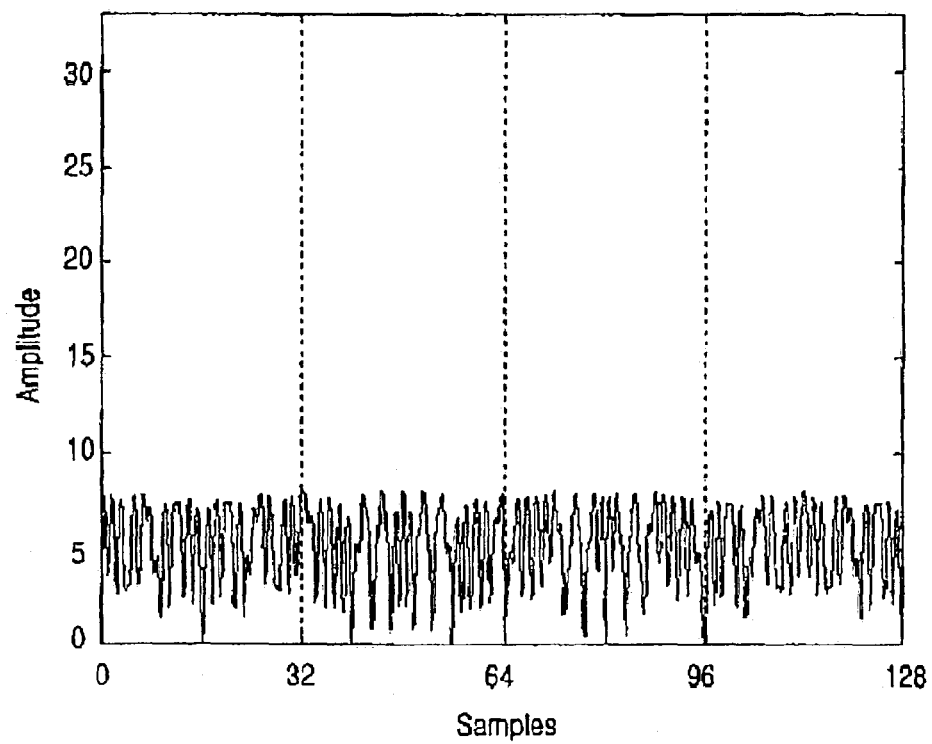
FIGS. 19A to 19D illustrate examples of OFDM signal waveforms in the time domain when the block coding according to the embodiment of the present invention is applied.
Figure 19B:
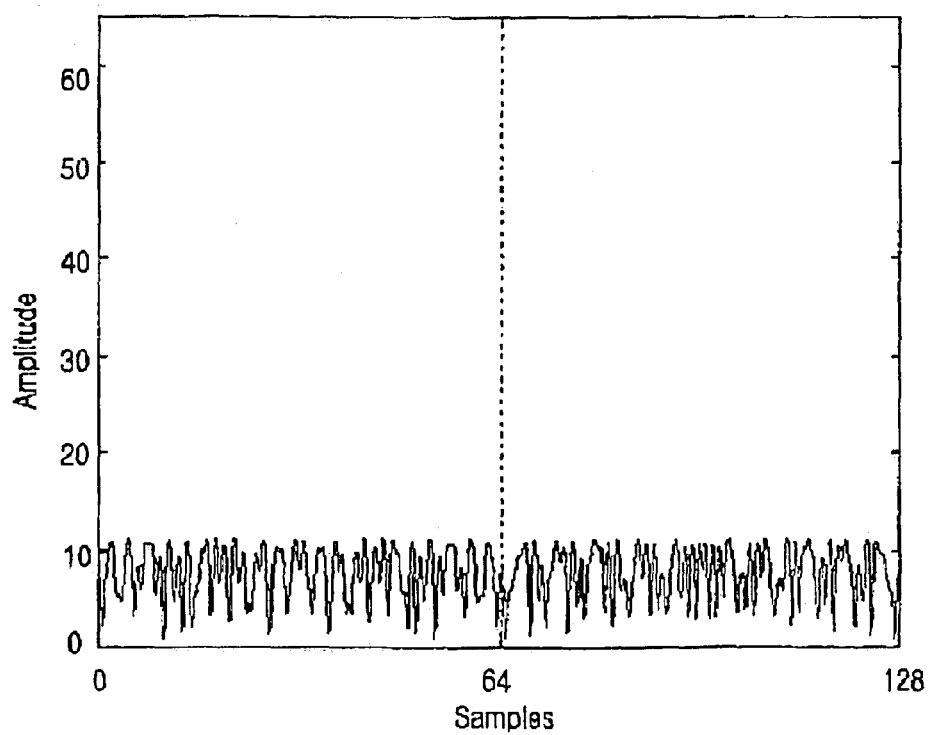
Figure 19C:
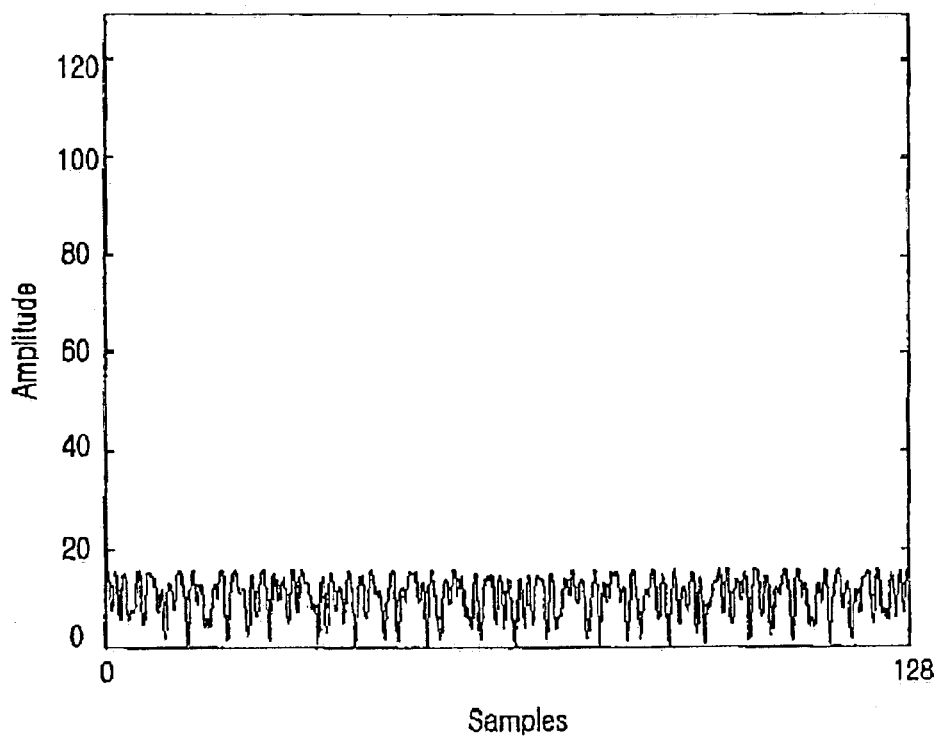
Figure 19D:
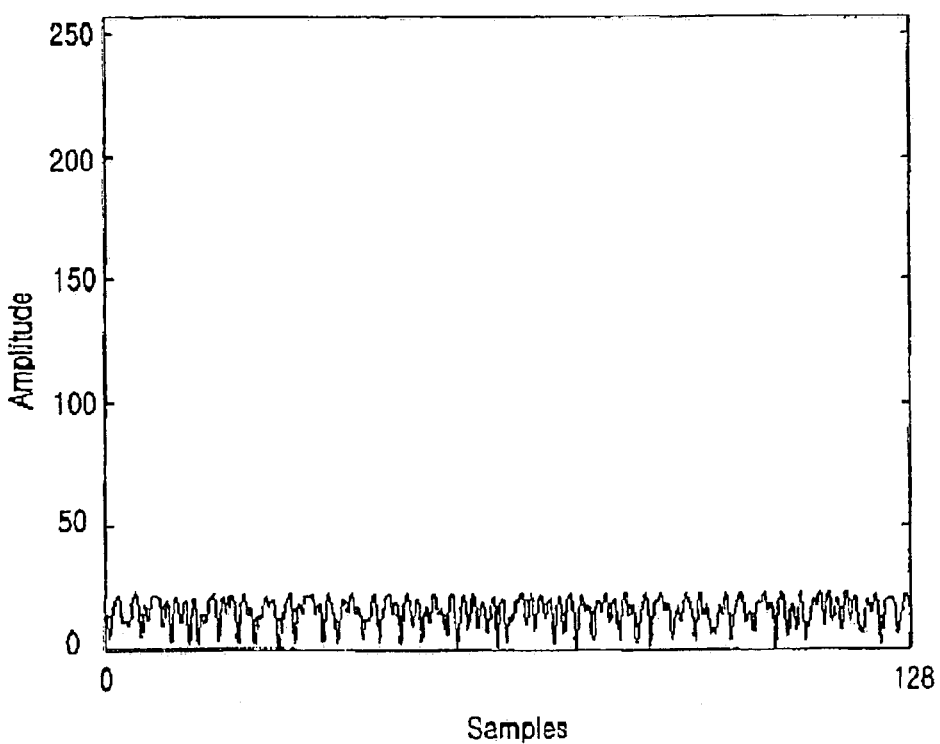

FIGS. 17 and 18 are block diagrams of a transmitter and a receiver using block coding for BPSK and N according to Eq. (14).

Referring to FIG. 17, a mapper 1710 modulates transmission data. An S/P converter 1712 converts the mapped w−(r−2) data, $k_1$ to $k_{w-(r-2)}$, to parallel data. All or part of the parallel data $k_1$ to $k_{w-(r-2)}$ are applied to the input of an operator generator 1714. The operator generator 1714 generates at least one operator bit $k_{w-(r-3)}$ to $k_w$ by Eq. (14). The operator bit signifies parity data for information data output from the S/P converter 1712. The number of operator bits is r−2 for N=$2^r$. The parity data $k_{w-(r-3)}$ to $k_w$ and the information data $k_1$ to $k_{w-(r-2)}$ are fed to a plurality of encoders, here two encoders 1716 and 1718. The two encoders 1716 and 1718 each receive an equal half of the data. That is, the first encoder 1716 receives the information data $k_1$ to $k_{w/2}$, while the second encoder 1718 receives the other information data $k_{w/2+1}$ to $k_{w-(r-2)}$ and the parity data $k_{w-(r-3)}$ to $k_w$. The encoders 1716 and 1718 output coded data $X_1$ to $X_N$ through block coding. Specifically, the first encoder 1716 outputs $X_1$ to $X_{N/2}$ for the input of $k_1$ to $k_{w/2}$, whereas the second encoder 11718 outputs $X_{N/2+1}$ to $X_N$ for the input of $k_{w/2+1}$ to $k_{w-(r-2)}$ and $k_{w-(r-3)}$ to $k_w$. An IFFT 1720 OFDM-modulates the N data received from the first and second encoders 11716 and 1718, and a P/S converter 1722 converts the OFDM modulated symbols to serial data and transmits them over the sub-carriers.

Referring to FIG. 18, an S/P converter 1810 converts a received input signal to parallel modulated symbols $x_1$ to $x_N$. An FFT 1812 fast-Fourier-transforms the modulated symbols to block coded information data $X_1$ to $X_N$. The information data $X_1$ to $X_N$ are equally divided for the input of a plurality of decoders, here two decoders 1814 and 1816. Hence, the first decoder 1814 receives the information data $X_1$ to $X_{N/2}$ and the second decoder 1816 receives the information data $X_{N/2+1}$ to $X_N$. The encoders 1814 and 1816 outputs information data $k_1$ to $k_{w/2}$ and $k_{w/2+1}$ to $k_w$ by hard-decision decoding of the input data. At the same time, the decoders 1814 and 1816 perform error correction. The parity data signifies at least one operator bit inserted in the transmitter. An operator remover 1818 identifies the at least one operator bit from the decoded data, removes the operator bits $k_{w-(r-2)+1}$ to $k_w$, and outputs only the information data $k_1$ to $k_{w-(r-2)}$. A P/S converter 1820 converts the information data to serial data. A demapper 1822 recovers the serial data to the original data.

3. Block Coding For QPSK and N=8

Figure 11:
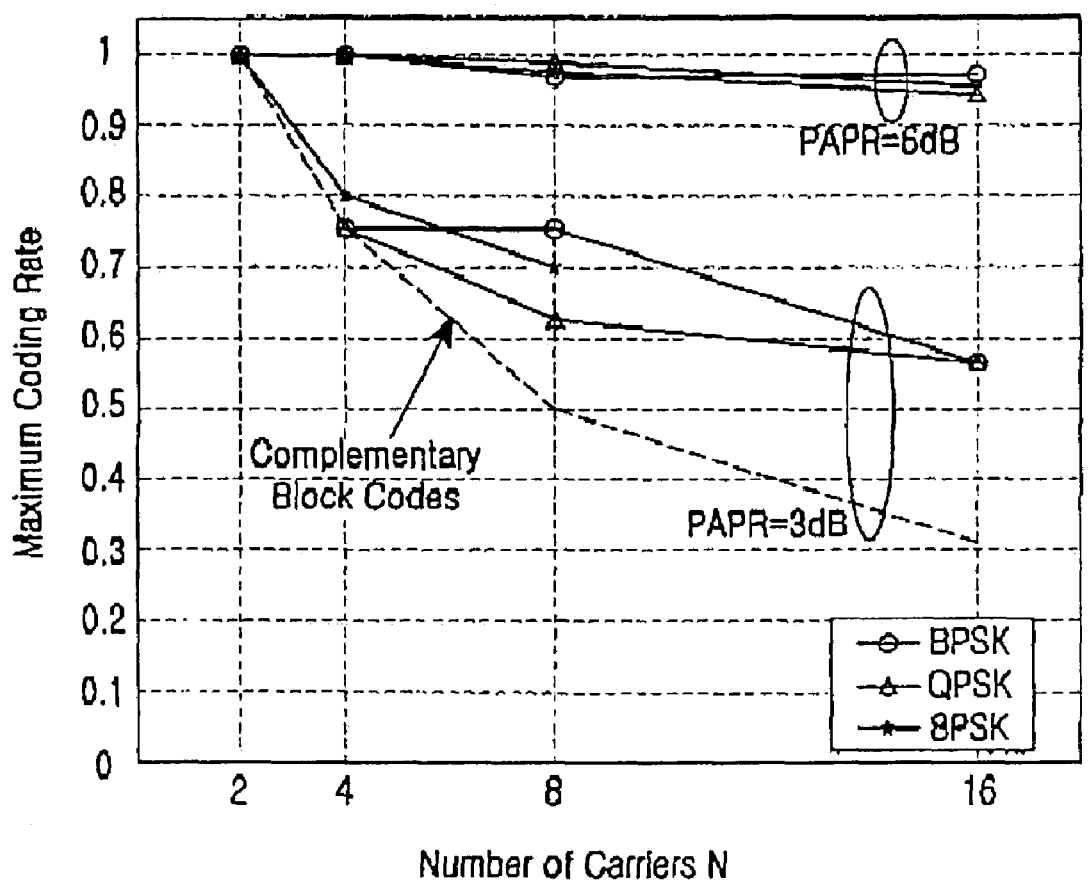
FIG. 11 is a graph illustrating a maximum coding rate versus the number of sub-carriers according to the embodiment of the present invention.

The block coding method of the present invention is applicable to an M-ary PSK modulation scheme as well as BPSK. For QPSK, (Quadrature Phase Shift Keying) and N=8, $4^8$ codewords are available. $4^5$ of the codewords have PAPRs equal to or less than 3 dB and the coding rate is 5/8 for these $4^5$ codewords, lower than the coding rate 6/8 for BPSK and N=8. Among the $4^5$ codewords, there are $4^{4.5}$ complementary sequences. Thus, the resulting coding rate is 4.5/8. This implies that the number of codewords with 3 dB or less PAPR for QPSK is less than that for BPSK. FIG. 11 illustrates a maximum coding rate versus the number of sub-carriers. As noted from FIG. 11, coding rate loss is small when the PAPR is limited to 3 dB and QPSK performs at a coding rate less than BPSK or 8PSK. In real implementation, the European Magic Wand system adopted block coding using complementary sequences and 8PSK.

In QPSK, a symbol is formed by $k_s = k_{bo} + j \cdot k_{be}$ (o denotes odd and e denotes even) where $k_b$ represents a bit and $k_s$ represents a symbol. Given the coding rate of 4.5/8 in the proposed method, $k_{b1}$ to $k_{b8}$ are information bits and $k_{b10}$ to $k_{b12}$ are parity bits. $k_{s5} (= k_{b9} + j \cdot k_{b10})$ is formed with $k_{s1}$ to $k_{s4}$ and a bit $k_{b9}$ by $$k_{b10} = k_{b1} \cdot k_{b2} \cdot k_{b3} \cdot k_{b4} \cdot k_{b7} \cdot k_{b8} \cdot k_{b9} \tag{15}$$

and $k_{s6}$ is determined by $$k_{s6} = \mathrm{mod}(\mathrm{mod}(k_{s2}+1, 2) \times 2 + k_{s2} + k_{s3} + k_{s5}, 4) \tag{16}$$

where mod(x, M) denotes modulo M for x. As a result, the coding rate is 4.5/8.

Figure 12:
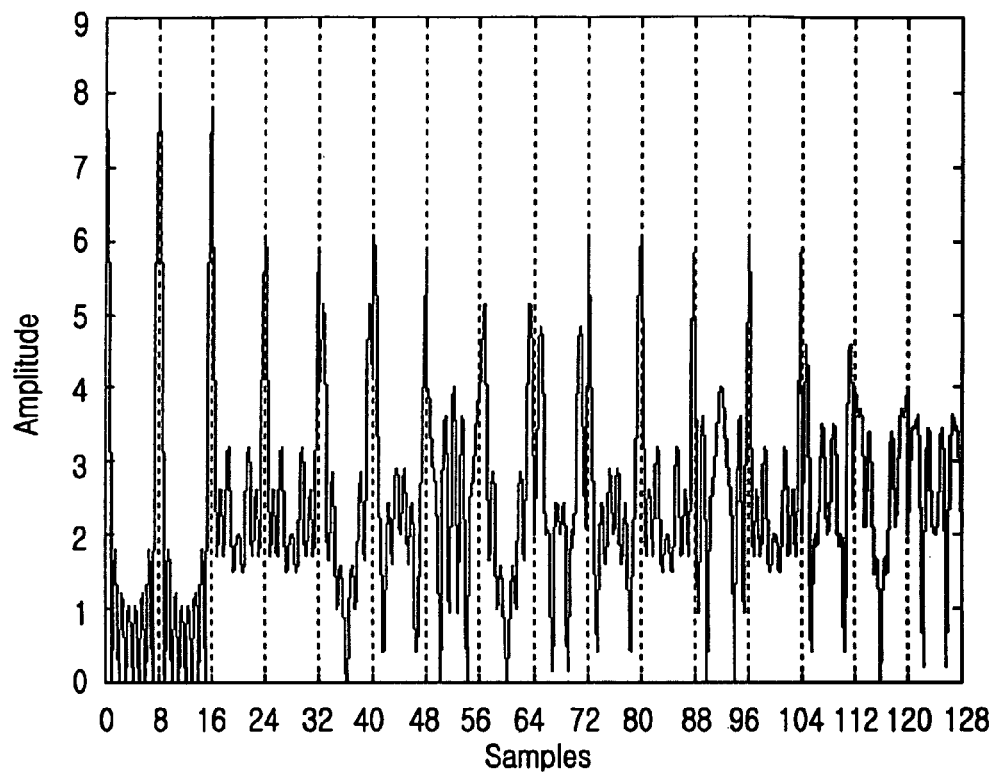
FIG. 12 illustrates a third example of OFDM signal waveforms in the time domain in the conventional OFDM mobile communication system using block coding.
Figure 13:
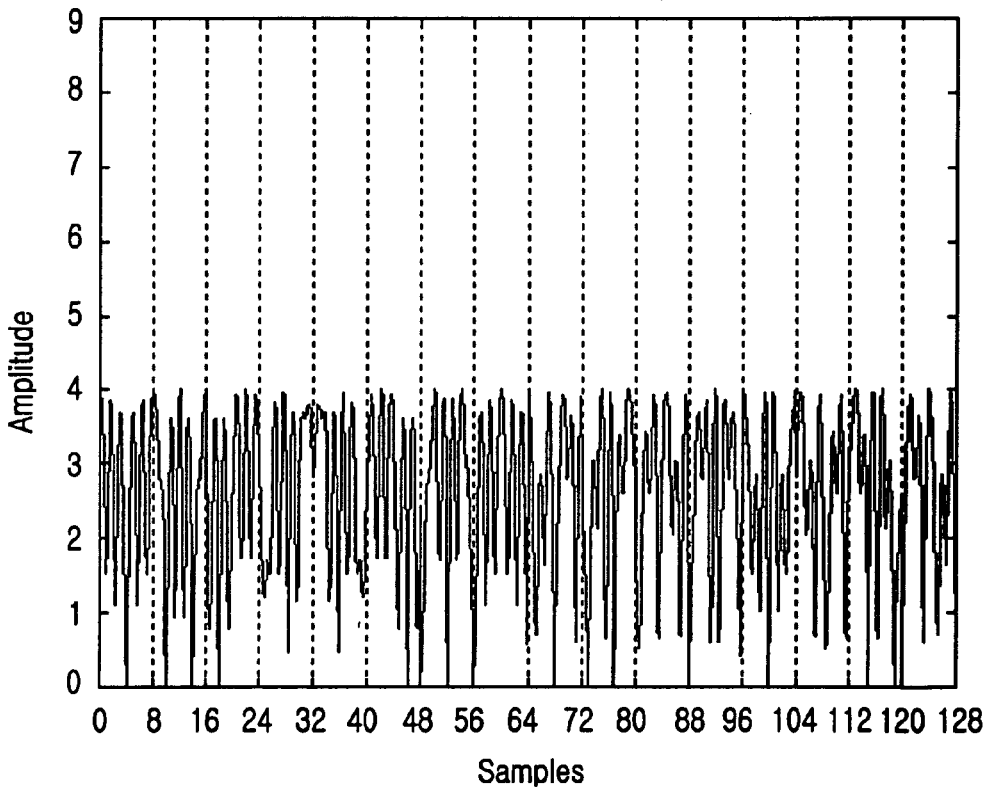
FIG. 13 illustrates a third example of OFDM signal waveforms in the time domain in the OFDM mobile communication system using block coding according to the embodiment of the present invention.

FIG. 12 illustrates OFDM signal waveforms for QPSK and N=8 in the time domain in the conventional OFDM mobile communication system using block coding, and FIG. 13 illustrates OFDM signal waveforms for QPSK and N=8 in the time domain in the OFDM mobile communication system using block coding according to the embodiment of the present invention. It is noted that the waveforms illustrated in FIG. 12 have higher peaks than those illustrated in FIG. 13 of which the PAPRs are limited according to the inventive block coding using two encoders.

FIGS. 19A to 19D illustrate OFDM signal waveforms for QPSK in the time domain when N=32, 64, 128, and 256, respectively in the OFDM mobile communication system using block coding.

Figure 14:
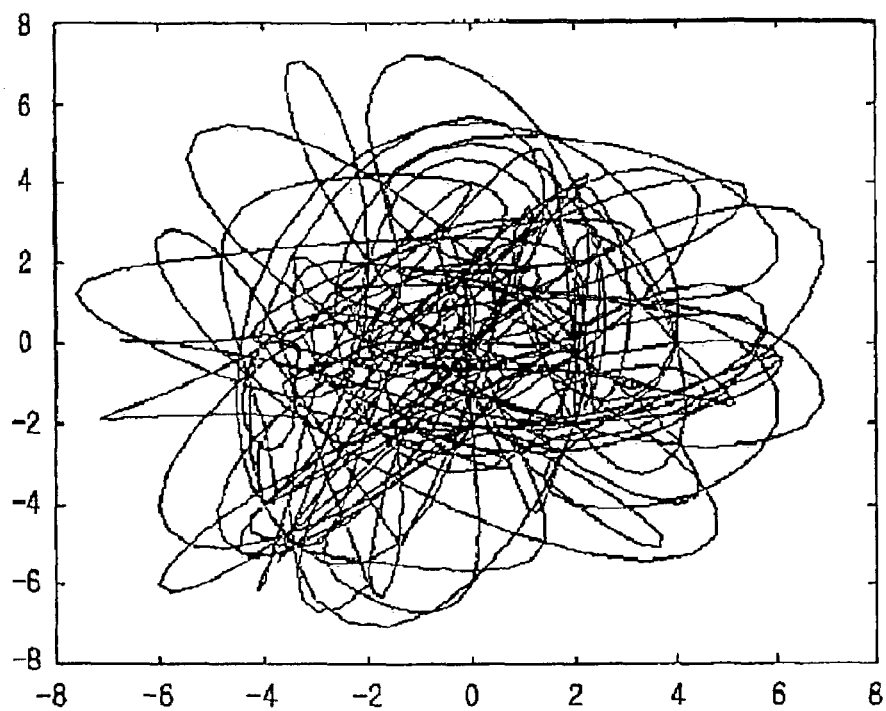
FIG. 14 illustrates a third example of an OFDM signal constellation trajectory in the conventional OFDM mobile communication system using block coding.
Figure 15:
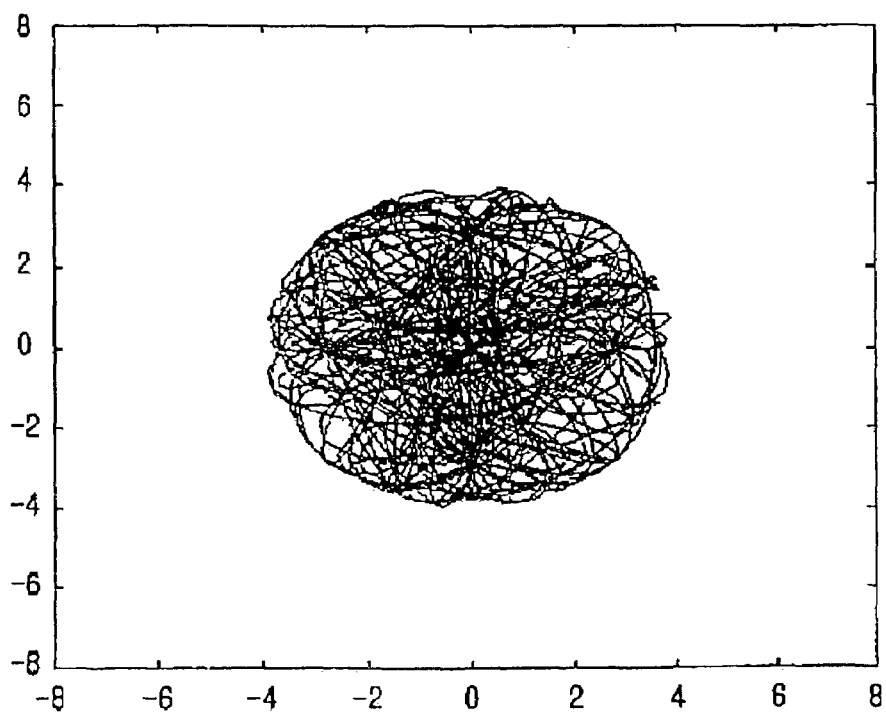
FIG. 15 illustrates a third example of an OFDM signal constellation trajectory in the OFDM mobile communication system using block coding according to the embodiment of the present invention.

FIG. 14 illustrates an OFDM signal constellation trajectory for QPSK and N=8 in the conventional OFDM mobile communication system using block coding and FIG. 15 an OFDM signal constellation trajectory for QPSK and N=8 in the OFDM mobile communication system using block coding according to the embodiment of the present invention. As illustrated, OFDM signals are concentrated in a particular area when the inventive block coding is applied for QPSK.

Figure 16:
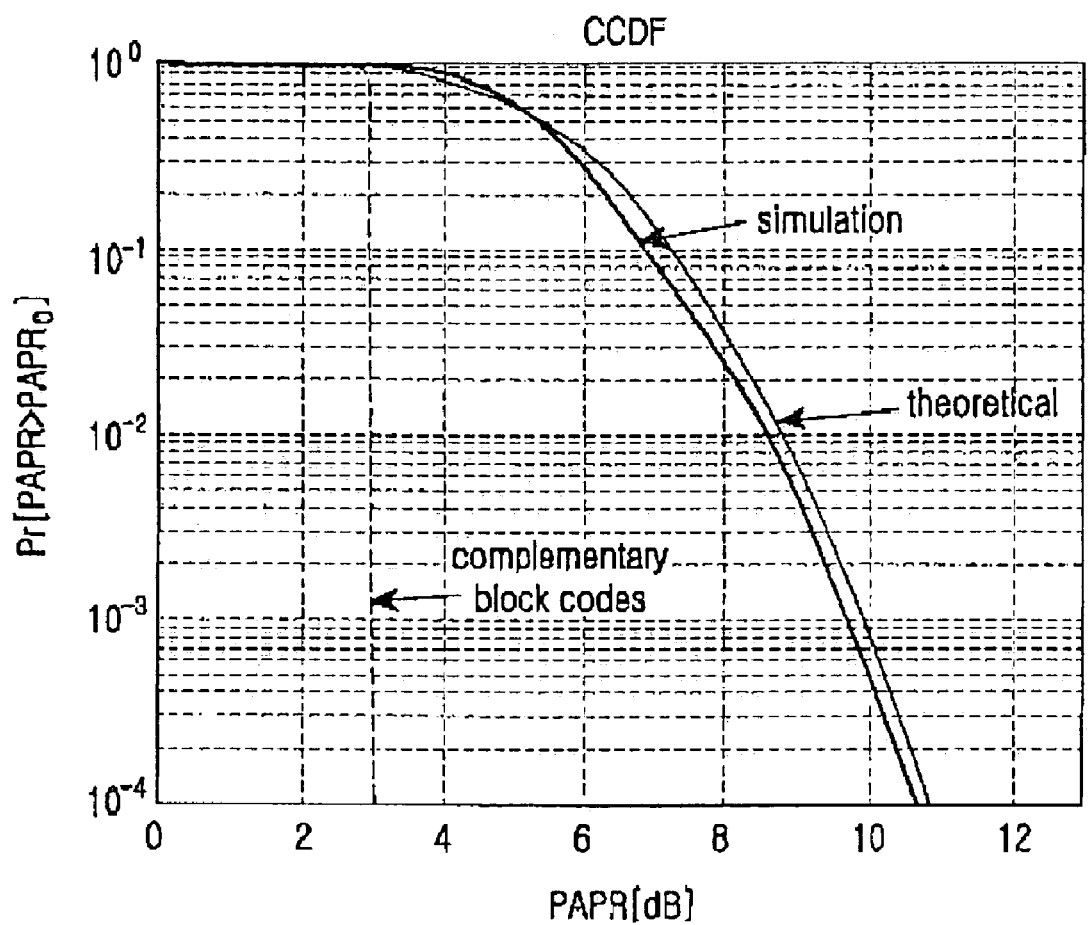
FIG. 16 illustrates the CCJDF (Complementary Cumulative Distribution Function) of a block coded OFDM signal for N=8 according to the embodiment of the present invention.

FIG. 16 illustrates the CCDF of an OFDM signal when N=8. Referring to FIG. 16, since the PAPR is confined, to 3 dB by block coding using complementary sequences, the probability of the PAPR exceeding 3 dB is zero.

As described above, block coding using complementary sequences limits PAPR to 3 dB or lower, while maintaining error correction capability, thus achieving a coding gain. Despite this advantage, as the number of sub-carriers increases, a coding rate decreases. In accordance with the present invention, on the other hand, a novel block coding scheme with improved spectral efficiency is proposed for PAPR reduction in the case where a large number of sub-carriers are used. That is, instead of one $E_N$ encoder, two $E_{N/2}$ encoders adopted and part of their inputs are set as parity data, so that the PAPR is decreased from 6 dB to 3 dB and a minimum Hamming distance is, maintained. Therefore, the error correction capability is preserved. Furthermore, the reduction of the $E_N$ block to the $E_{N/2}$ blocks facilitates decoding. The coding rate is increased from $$\frac{w}{2^{w-1}}$$

to $$\frac{w}{2^{w-2}},$$

which leads to a 3 dB spectral efficiency improvement, as compared to the traditional PAPR reduction method through block coding. Notably, the present invention is applicable irrespective of the number of sub-carriers and also to M-ary PSK modulation schemes.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A transmitting apparatus for reducing the peak-to-average power ratio (PAPR) of a signal transmitted on N($=2^r$) sub-carriers in the transmitting apparatus including encoders for block coding w input data, where r is a natural number more than 2, and outputting N code symbols in an orthogonal frequency division multiplexing (OFDM) communication system, the transmitting apparatus comprising:
   a serial to parallel (S/P) converter for converting a data stream in to w−(r−2) parallel data streams, where w is the length of an information word;
   a first encoder for receiving w/2 parallel data streams of the w−(r−2) parallel data streams from the serial to parallel converter, block coding the w/2 parallel data streams, and outputting N/2 first code symbols;
   an input operator generator for generating (r−2) input operator data streams according to the w−(r−2) parallel data streams; and
   a second encoder for receiving the parallel data streams from the serial to parallel converter not input into the first encoder and the (r−2) input operator data streams, block coding the received data streams, and outputting N/2 second code symbols,
   wherein the (r−2) input operator data streams make N code symbols complementary.

2. The transmitting apparatus of claim 1, wherein when the transmitting apparatus uses BPSK (Binary Phase Shift Keying), the input operator generator generates the input operator data streams by the following equation, where k represents a data stream output from the S/P converter, $k_{2r} = -k_2 \cdot k_r \cdot k_{r+2}$ $k_{2r-i} = k_1 \cdot k_{r-i} \cdot k_{r+1}, i=1, \ldots, (r-3).$ 3. The transmitting apparatus of claim 1, wherein when the transmitting apparatus uses QPSK (Quadrature Phase Shift Keying), the input operator generator generates the input operator data streams by the following equation, where k represents a data stream output from the S/P converter, $k_{b10} = k_{b1} \cdot k_{b2} \cdot k_{b3} \cdot k_{b4} \cdot k_{b7} \cdot k_{b8} \cdot k_{b9}$ $k_{s6} = \mathrm{mod}(\mathrm{mod}(k_{s2}+1,2) \times 2 + k_{s2} + k_{s3} + k_{s5}, 4)$ where mod (x,M) denotes modulo M for x.

4. A transmitting method for reducing the peak-to-average power ratio (PAPR) of a signal transmitted on N ($=2^r$) sub-carriers in a transmitting apparatus including encoders for block coding w input data where r is a natural number more than 2, and outputting N code symbols in an orthogonal frequency division multiplexing (OFDM) communication system, the transmitting method comprising:
   (1) converting a data stream in to w−(r−2) parallel data streams, where w is the length of an information word;
   (2) block coding w/2 parallel data streams of the w−(r−2) parallel data streams and outputting N/2 first code symbols;
   (3) generating (r−2) input operator data streams according to the w−(r−2) parallel data streams; and
   (4) block coding the parallel data streams not subject to the block coding, and the (r−2) input operator data streams and outputting N/2 second code symbols,
   wherein the (r−2) input operator data streams make N code symbols complementary.

5. The transmitting method of claim 4, wherein when the transmitting apparatus uses BPSK (Binary Phase Shift Keying), the input operator data streams are determined by the following equations, where k represents a converted data stream, $k_{2r} = -k_2 \cdot k_r \cdot k_{r+2}$ $k_{2r-i} = k_1 \cdot k_{r-i} \cdot k_{r+1}, i=1, \ldots, (r-3).$ 6. The transmitting method of claim 4, wherein when the transmitting apparatus uses QPSK (Quadrature Phase Shift Keying), the input operator data streams are generated by the following equations, where k represents a converted data stream, $k_{b10} = k_{b1} \cdot k_{b2} \cdot k_{b3} \cdot k_{b4} \cdot k_{b7} \cdot k_{b8} \cdot k_{b9}$ $k_{s6} = \mathrm{mod}(\mathrm{mod}(k_{s2}+1,2) \times 2 + k_{s2} + k_{s3} + k_{s5}, 4)$ where mod (x, M) denotes modulo M for x.

7. A transmitting method for reducing peak-to-average power ratio (PAPR) of a signal transmitted on a plurality of(N $2^r$) sub-carriers in a transmitting apparatus including a serial to parallel converter for converting serial data into parallel data streams $k_1, k_2, \ldots, k_{r+2}$ and a plurality of encoders for block coding the parallel data streams $k_1, k_2, \ldots, k_{r+2}$ in an orthogonal frequency division multiplexing (OFDM) mobile communication system where r is a natural number more than 2, the transmitting method comprising:
   receiving at least one of the parallel data streams and generating at least one operator bit $k_{r+3}, \ldots, k_{2r}$ that renders block coded symbols complementary; and
   distributing the parallel data streams and the at least one operator bit to the encoders, and block coding the distributed data,
   wherein the at least one operator bit is provided to one of the encoders.

8. The transmitting method of claim 7, wherein the number of operator bits is determined as r−2 according to the number of sub-carriers.

9. The transmitting method of claim 7, wherein when the transmitting apparatus uses BPSK (Binary Phase Shift Keying), the input operator data streams are determined by the following equations, where k represents a converted data stream, $k_{2r} = -k_2 \cdot k_r \cdot k_{r+2}$ $k_{2r-i} = k_1 \cdot k_{r-i} \cdot k_{r+1}, i=1, \ldots, (r-3).$ 10. The transmitting method of claim 7, wherein when the transmitting apparatus uses QPSK (Quadrature Phase Shift Keying), the input operator data streams are determined by the following equations, where k represents a converted data stream, $k_{b10} = k_{b1} \cdot k_{b2} \cdot k_{b3} \cdot k_{b4} \cdot k_{b7} \cdot k_{b8} \cdot k_{b9}$ $k_{s6} = \mathrm{mod}(\mathrm{mod}(k_{s2}+1,2) \times 2 + k_{s2} + k_{s3} + k_{s5}, 4)$ where mod (x,M) denotes modulo M for x.

11. A transmitting apparatus for reducing peak-to-average power ratio (PAPR) of a signal transmitted on a plurality of(N$=2^r$) sub-carriers in the transmitting apparatus including a serial to parallel converter for converting serial data into parallel data streams $k_1, k_2, \ldots, k_{r+2}$ in an orthogonal frequency division multiplexing (OFDM) communication system where r is a natural number more than 2, the transmitting apparatus comprising:
   an operator generator for receiving at least one of the parallel data streams and generating at least one operator bit $k_{r+3}, \ldots, k_{2r}$ that renders block coded symbols complementary; and a plurality of encoders receiving the parallel data streams and the at least one operator bit $K_{r+3}, \ldots, k_{2r}$, and block coding the received data, wherein the at least one operator bit is block-coded by one of the encoders.

12. The transmitting apparatus of claim 11, wherein the number of operator bits is determined as r−2 according to the number of sub-carriers.

13. The transmitting apparatus of claim 11, wherein when the transmitting apparatus uses BPSK (Binary Phase Shift Keying), the operator generator determines the input operator data streams by the following equations, where k represents a converted data stream, $$k_{2r} = -k_2 \cdot k_r \cdot k_{r+2}$$

$$k_{2r-i} = k_1 \cdot k_{r-i} \cdot k_{r+1}, i=1, \ldots, (r-3).$$

14. The transmitting apparatus of claim 11, wherein when the transmitting apparatus uses QPSK (Quadrature Phase Shift Keying), the operator generator determines the input operator data streams by the following equations, where k represents a converted data stream, $$k_{b10} = k_{b1} \cdot k_{b2} \cdot k_{b3} \cdot k_{b4} \cdot k_{b7} \cdot k_{b8} \cdot k_{b9}$$

$$k_{s6} = \mathrm{mod}(\mathrm{mod}(k_{s2}+1,2) \times 2 + k_{s2} + k_{s3} + k_{s5}, 4)$$

where mod (x, M) denotes modulo M for x.

15. A receiving method for demodulating decoded data streams $k_1, k_2, \ldots, k_{2r}$ in a receiving apparatus that converts a serial input signal in to parallel data streams where r is a natural number more than 2, Fourier-transforming the parallel data streams, and distributing the Fourier-transformed data equally to a plurality of decoders in an orthogonal frequency division multiplexing (OFDM) mobile communication system, the receiving method comprising:

identifying at least one operator bit $k_{r+3}, \ldots, k_{2r}$ from the decoded data streams; removing the at least one operator bit from the decoded data streams; and recovering source data from information data streams $k_1, k_2, \ldots, k_{r+2}$ free of the at least one operator bit.

16. The receiving method of claim 15, wherein the number of operator bits is determined as r−2 according to the number of sub-carriers used in a transmitting apparatus.

17. A receiving apparatus for demodulating decoded data streams $k_1, k_2, \ldots, k_{2r}$ in the receiving apparatus including a serial to parallel converter for converting a serial input signal in to parallel data streams where r is a natural number more than 2, and a Fourier transformer for Fourier-transforming the parallel data streams in an orthogonal frequency division multiplexing (OFDM) mobile communication system, the receiving apparatus comprising:

a plurality of decoders, each for receiving an equal number of Fourier-transformed complementary sequences and decoding the received complementary sequences;

an operator remover for identifying at least one operator bit $k_{r+3}, \ldots, k_{2r}$ from the decoded data streams and removing the at least one operator bit from the decoded data streams; and a demapper for recovering source data from information data streams $k_1, k_2, \ldots, k_{r+2}$ free of the at least one operator bit.

18. The receiving apparatus of claim 17, wherein the number of operator bits is determined as r−2 according to the number of sub-carriers used in a transmitting apparatus.

* * * * *